US010650575B2

(12) United States Patent
Shane (10) Patent No.: US 10,650,575 B2
(45) Date of Patent: May 12, 2020

(54) METHOD AND SYSTEM FOR COMPUTER GRAPHICS RENDERING (71) Applicant: Pointerra Technologies Pty Ltd, Perth (AU)

(72) Inventor: Douglas Shane, Perth (AU)

(73) Assignee: Pointerra Technologies Pty Ltd, Perth (AU)

( * ) Notice: Subject to any disclaimer, the term of this patent is extended or adjusted under 35 U.S.C. 154(b) by 0 days.

(21) Appl. No.: 15/571,262

(22) PCT Filed: May 11, 2016

(86) PCT No.: PCT/AU2016/050357
§ 371 (c)(1),
(2) Date: Dec. 6, 2017

(87) PCT Pub. No.: WO2016/179659
PCT Pub. Date: Nov. 17, 2016

(65) Prior Publication Data
US 2018/0114357 A1  Apr. 26, 2018

(30) Foreign Application Priority Data
May 11, 2015 (AU) ................................ 2015901712

(51) Int. Cl.
*G06T 15/30* (2011.01)
*G06T 17/00* (2006.01)
(52) U.S. Cl.
CPC ............ *G06T 15/30* (2013.01); *G06T 17/005* (2013.01)
(58) Field of Classification Search
CPC ............................ G06T 15/30; G06T 17/005
See application file for complete search history.

(56) References Cited

U.S. PATENT DOCUMENTS

| 4,694,404 A | 9/1987 | Meagher |
| 5,864,342 A * | 1/1999 | Kajiya .................. G06T 11/001 345/418 |

(Continued)

FOREIGN PATENT DOCUMENTS

WO  2014043735 A1  3/2014

OTHER PUBLICATIONS

Naylor, Bruce F. "Partitioning tree image representation and generation from 3D geometric models." Proceedings of Graphics Interface. vol. 92. 1992.*

(Continued)

*Primary Examiner* — Sultana M Zalalee
(74) *Attorney, Agent, or Firm* — Oppedahl Patent Law Firm LLC (57) ABSTRACT

A method and system of computer graphics rendering implemented upon a processor in communication with a memory device storing a data comprises: loading a data structure representing at least a part of a scene in world space for display into the processor; a transform module transforming the data structure from world space to clip space; a dividing module subdividing the data structure in clip space so as to form child data structures; and a testing module testing which of the plurality of child data structures are within a viewing frustum, so that child data structures outside of the viewing frustum are discarded and a plurality of remaining nodes are retained. The plurality of remaining data structures are subsequently subdivided and tested until the plurality of remaining data structures do not overlap with the viewing frustum. A display module processing the plurality of remaining data structures for generation of an image on a display device.

20 Claims, 5 Drawing Sheets

(56) References Cited

U.S. PATENT DOCUMENTS

| | | | | |
|---|---|---|---|---|
| 6,072,495 | A * | 6/2000 | Watanabe | G06F 16/58 |
| | | | | 345/419 |
| 6,262,742 | B1 * | 7/2001 | Tampieri | G06T 15/00 |
| | | | | 345/426 |
| 9,519,997 | B1 * | 12/2016 | Ryu | G06T 15/30 |
| 2001/0055019 | A1 | 12/2001 | Sowizral | |
| 2002/0101417 | A1 * | 8/2002 | Burk | G06T 5/20 |
| | | | | 345/418 |
| 2003/0214502 | A1 | 11/2003 | Park et al. | |
| 2003/0227455 | A1 | 12/2003 | Lake et al. | |
| 2004/0233171 | A1 * | 11/2004 | Bell | G06T 15/40 |
| | | | | 345/168 |
| 2008/0225048 | A1 * | 9/2008 | Bijankumar | G06T 15/40 |
| | | | | 345/421 |
| 2011/0169822 | A1 | 7/2011 | Gardella et al. | |
| 2014/0040215 | A1 * | 2/2014 | Cai | G06T 17/005 |
| | | | | 707/693 |
| 2015/0123968 | A1 * | 5/2015 | Holverda | G06K 9/4604 |
| | | | | 345/422 |

OTHER PUBLICATIONS

International preliminary report on patentability (Chapter II) in PCT application No. PCT/AU2016/050357, completed on Jan. 3, 2017.
'Optimized View Frustum Culling Algorithms' (online); Assarsson, U. et al., Mar. 1999. [Retrieved from the internet on Apr. 21, 2016], http://www.cse.chalmers.se/~uffe/vfc.pdf.
'Accelerated Occlusion Culling using Shadow Frusta' (online) ; Hudson, T. et al., Jun. 1997 [Retrieved from the Internet on Apr. 21, 2016], http://www.cs.unc.edu/~walk/papers/hudson/shadow.pdf.
International Search Report in PCT application No. PCT/AU2016/050357, dated Jul. 4, 2016.

* cited by examiner

METHOD AND SYSTEM FOR COMPUTER GRAPHICS RENDERING

FIELD OF THE INVENTION

The present invention relates to a method for computer graphics rendering of data structures and a system for rendering computer graphics for display.

BACKGROUND

Computer graphics rendering is the process of converting 2D or 3D models into a generated image for a display on a display screen. For the generation 3D computer graphics, an octree may be used for partitioning a three dimensional space. This partitioning is achieved by recursively subdividing the space into eight octants, to a point where further subdivision is redundant for a given resolution.

Conventionally, the calculation and processing of the octree is conducted by general-purpose computing on graphics processing units (GPGPU). In this situation, the octree data is loaded onto a GPGPU rendering pipeline for processing. As the processing of the octree is conducted by subdivision in world space with subsequent frustum culling in world space, this process becomes impractical for a large octree due to memory limitations of the graphics processing unit(s). In order to circumvent this issue, the part of the octree that can be seen in a viewing frustum is loaded on demand. Unfortunately with dynamic viewing, this requires constant updates of the loaded portion of the octree, which becomes impractical.

An alternative solution to the issue would be to use a plurality of central processing units to create an image of the octree and display it on the electronic display screen by bit block transfer. Normally the process of determining which nodes of the octree are within the viewing frustum and transforming their contents to create the image are computationally too expensive to accomplish this at any reasonable frame rate.

It would be advantageous if a computer graphics rendering method for displaying 3D computer graphics based on data structure (such as octree) calculations was provided that overcame the problems discussed above or which is at least a useful alternative to those methods that have been known.

SUMMARY OF INVENTION

According an aspect of the invention, there is provided a method of computer graphics rendering implemented upon a processor, the method comprising:
loading a data structure representing at least a part of a scene in world space for display into the processor;
transforming the data structure from world space into clip space;
subdividing the data structure in clip space so as to form child data structures, each child data structure comprising at least one node;
testing which of the plurality of child data structures are within a viewing frustum, so that child data structures outside of the viewing frustum are discarded and a plurality of remaining nodes are retained;
wherein the plurality of remaining data nodes are subsequently subdivided and tested until the plurality of remaining data nodes do not overlap with the viewing frustum, and processing the plurality of remaining data nodes for generation of an image on a display device.

According to an embodiment of the invention, the world space data comprises a parent octree.

In an embodiment transforming the data structure from world space to clip space comprises transforming the parent octree node from world space to clip space.

In an embodiment subdividing the data structure in clip space so as to form child data structures comprises subdividing the parent octree node in clip space so as to form child octree nodes.

In an embodiment the plurality of remaining nodes are further repeatedly subdivided into a plurality of new child nodes and tested before the plurality of remaining nodes are processed for generation of an image on the electronic display device.

In an embodiment the plurality of remaining nodes are recursively subdivided and tested to be within the viewing frustum until a stop condition is met.

In an embodiment the stop condition is met when the size of a plurality of remaining nodes is too small to effectively display on the display screen.

In an embodiment the image is generated on the electronic display device by bit block transfer.

According to another aspect of the invention, there is provided a system of computer graphics rendering, the system comprising:
a processing unit in communication with a memory device storing a data, wherein the processing unit is arranged to control a display device, wherein the processing unit is arranged to create or load a data structure representing at least a part of a scene in world space for display;
a transform module for transforming the data structure from world space to clip space; a dividing module for subdividing the data structure in clip space so as to form child data structures;
a testing module for testing which of the plurality of child data structures are within a viewing frustum, so that child data structures outside of the viewing frustum are discarded and a plurality of remaining nodes are retained;
wherein the plurality of remaining data structures are subsequently subdivided and tested until the plurality of remaining data structures do not overlap with the viewing frustum, and a display module for processing the plurality of remaining data structures for generation of an image on a display device.

According to an embodiment of the invention, the division module is configured such that the plurality of remaining nodes are further subdivided into a plurality of new child nodes and the method repeated from the beginning before the plurality of remaining nodes are subsequently processed to generate an image on the electronic display device.

In an embodiment the division module is configured such that the plurality of remaining nodes are recursively subjected to subdivision and testing to be within the viewing frustum until the size of a plurality of remaining nodes are too small to effectively display on the electronic display screen.

According to a preferred embodiment of the invention, the system further comprises a bit block transfer module for transfer of the data structure representing the image to a GPU for generation of the image on the display device.

According to another aspect of the present invention there is provided a computer program comprising instructions for controlling a processor to perform the method described above.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DESCRIPTION OF DRAWINGS

In order to provide a better understanding of the present invention embodiments will now be described by way of example only, with reference to the drawings, in which:—

DESCRIPTION OF EMBODIMENTS

Figure 1:
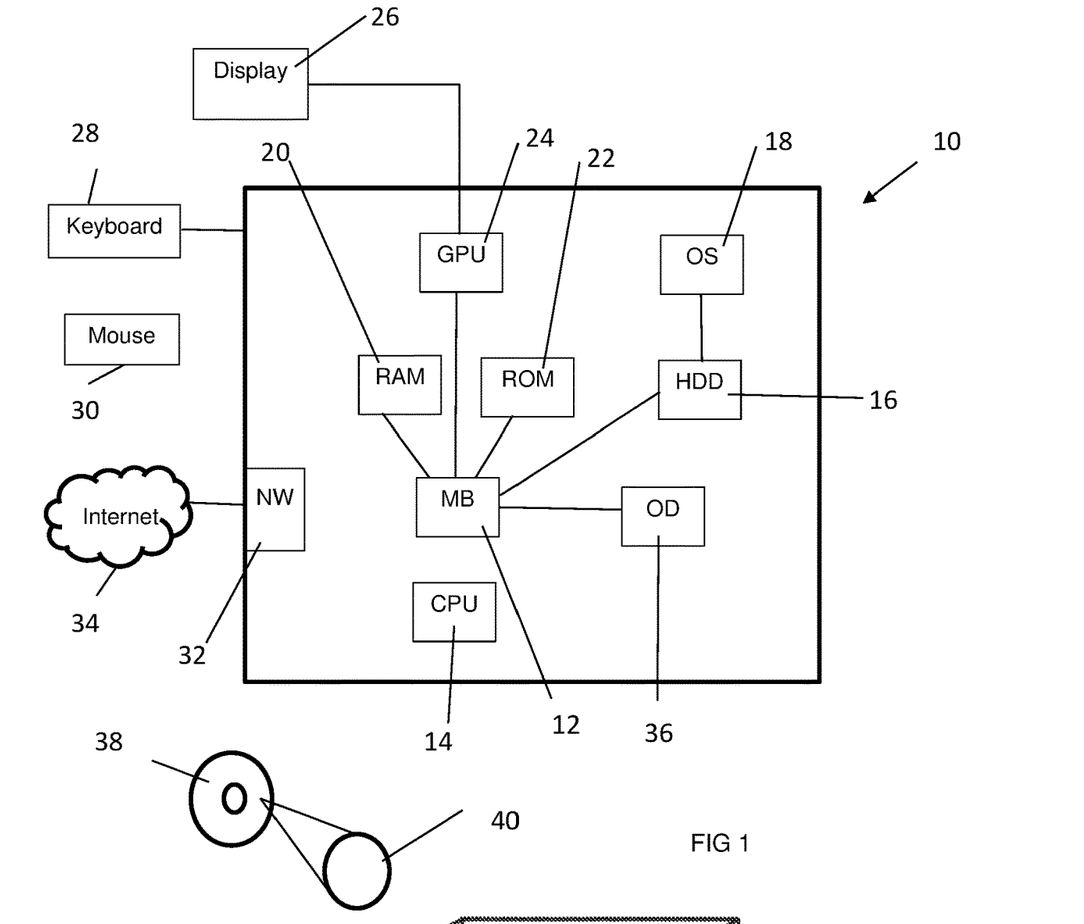
FIG. 1 illustrates a computer system for implementing a method according to an embodiment of the present invention.

FIG. 1 shows a block diagram of a typical computer system 10 for carrying out a method of computer graphics rendering according to an embodiment that will be described. The computer system 10 may be for example, a personal computer, a gaming console, a tablet, a smart phone or a dedicated computing system for example a medical imaging device.

In an embodiment the computer system 10 comprises a central processing unit based system for carrying out the method. The system 10 comprises a mother board 12 which is capable of powering and interfacing to at least one central processing unit 14. The central processing unit 14 may be configured to have a plurality of discrete processors or processors with multiple processing cores. Examples of the central processing unit are the Core series of processors manufacture by Intel Corp or the FX series of processors manufactured by Advanced Micro Devices Inc.

A storage drive 16 is interfaced to the motherboard 12. The storage drive 16 may comprise one or more typical storage drives, such as by way of example, hard disk drives or solid state drives. An operating system 18 is stored in the storage drive 16 in order to provide instructions to the computer system 10. The mother board 12 is also in communication with a random access memory 20 and a read only memory 22. The random access memory 20 is typically used as temporary storage and working space for the operating system. The read only memory 22 is typically used to store instructions for a Basic Input Output System which is accessed by the central processing unit 12 to prepare the computer system 10 to load the operating system 18. An optical device 36 may be interfaced to the mother board 12 to allow access to an optical storage device, such as a CD, DVD, or Blu-ray.

A graphics processor unit 24 is interfaced to the motherboard 12. The graphics processor unit 24 may also be arranged so as to be integrated to the mother board 12 or the central processing unit 14.

The mother board 12 may include a network interface module 32, such as by way of example, a local area network adaptor or a wireless network adaptor. The network interface module 32 allows the computer system 10 to connect to a computer network 34, such as by way of example, the internet. The computer program described below, or data for the computer program may be obtained from the computer network 34.

The computer system 10 is interfaced by a user by means of peripherals, such as by way of example, a keyboard 28, a mouse 21 and a display screen 26. The display screen 26 may be of any suitable type, such as by way of example, a liquid crystal display, a light emitting diode display or a cathode ray tube display. The graphics processor unit 24 controls the images displayed on the display screen 26. The computer system 10 is configured by modules, which may comprise sub-modules, which interact with and exchange data to perform the present invention. The modules may be implemented in hardware, that is as electronic circuits, or in the form of functional arrangements 100 implemented by instructions that control the CPU(s) and/or GPU(s). The control instructions are commonly referred to as computer programs. The computer programs are embodied in a non-transitory computer readable medium 38, such as a permanent optical, magnetic or other electronic storage medium.

Figure 6:
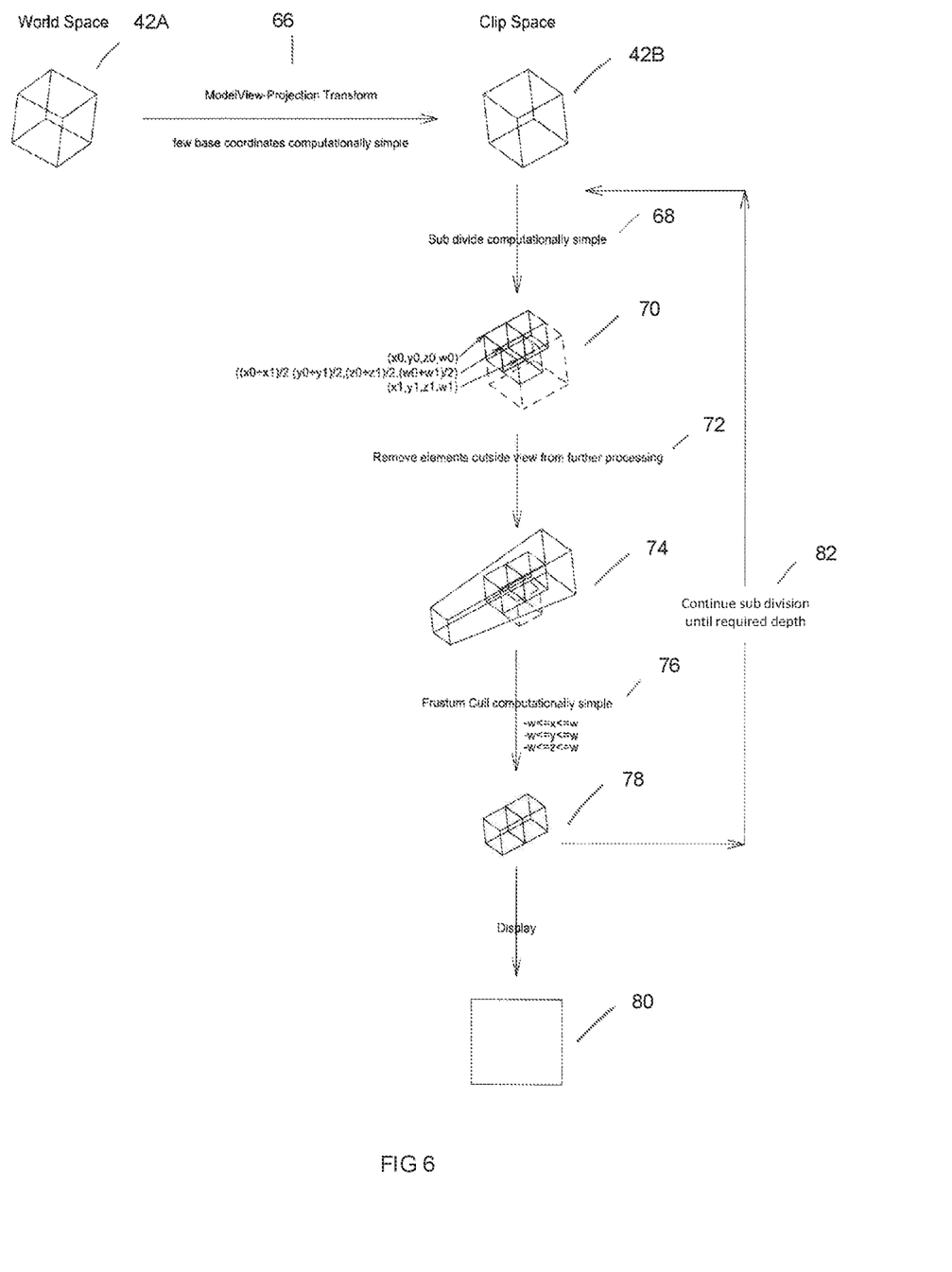
FIG. 6 illustrates a flowchart of the method according to an embodiment of the present invention and FIG. 7 illustrates a set of functional modules of a processor and data transfer between the modules according to an embodiment of the present invention.
Figure 7:
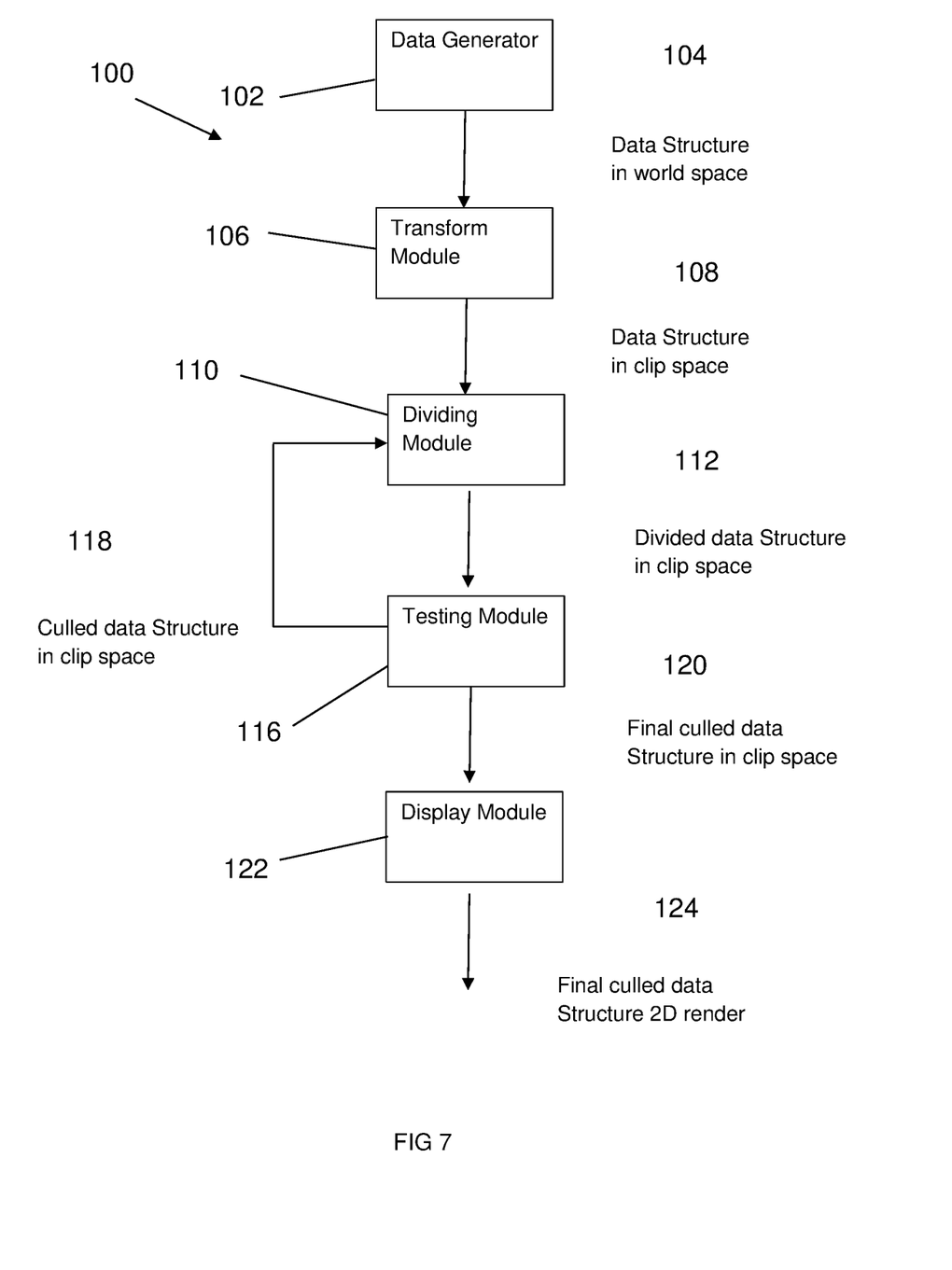

A computer graphics software 40 is installed upon the computer system 10. The software 40 may be regarded as the data generator 102 in FIG. 6. The computer graphics software 40 may be a part of an application that requires display of, for example, one or more objects on the display screen 26. The computer graphics software 40 contains or creates data structures for storing data in computer memory to define images and instructions so that the computer graphics software may alter the images in response to inputs via the peripherals. For example the software application may be a computer game that displays objects that form a scene for the user to interact with according to the game, in a manner where a user input produces a dynamic response to the displayed objects and thus the scene.

The data structures are typically in the form of positional coordinates that require processing, such as in a render pipeline in order to transform the data from 3D coordinates into 2D graphics for displaying upon the electronic display screen 26. The processing is typically computationally large due to the calculations required to transform the 3D coordinates into 2D graphics that mimic perspective and object size according to distance from a selected viewpoint. In order to simplify processes and reduce the computational requirements of processing the data structures, a preferred data structure of an octree may be used. The octree is a simple equal distance binary recursive subdivision of space starting from an initial cube that contains all the data. An alternative data structure to an octree is a binary space positioning tree.

Figure 2:
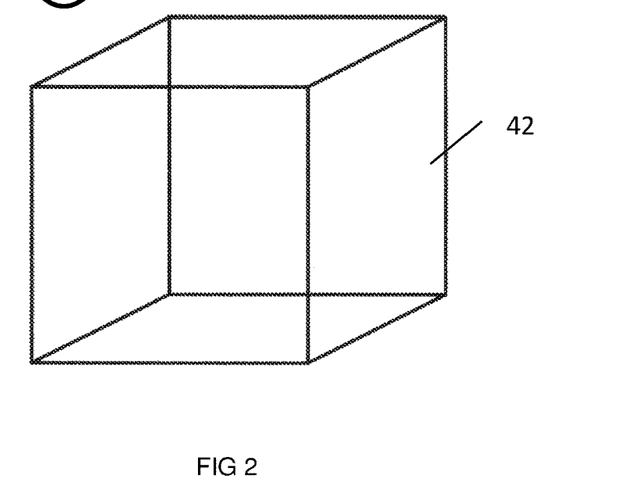
FIG. 2 illustrates a wireframe cube comprising a simple scene.

FIG. 2 shows a wireframe cube 42 for rendering in order to be displayed on the electronic display screen 26. The data of the wireframe cube 42 is stored as an octree data structure. In this situation, the cube 42 would be considered as a node.

Figure 3:
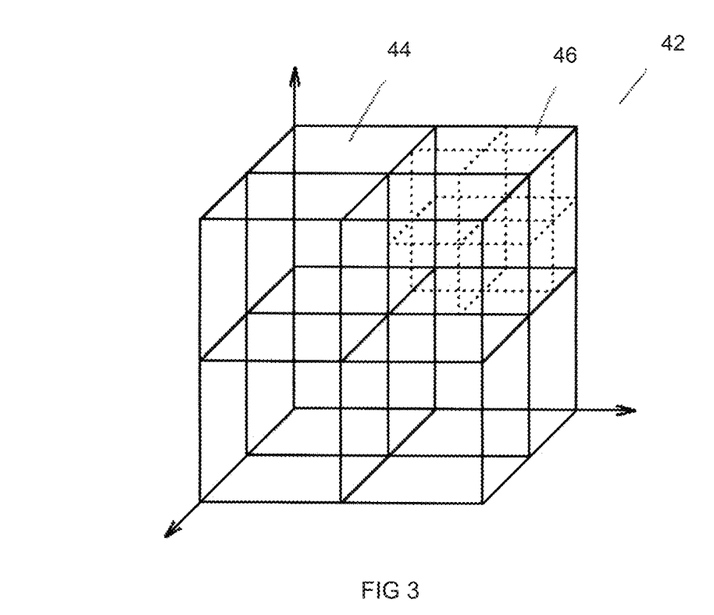
FIG. 3 illustrates a subdivided octree of the cube of FIG. 2.

FIG. 3 shows the cube 42 becoming a parent node by the subdivision into eight octants, wherein each octant is a child node 44. Additionally, each child node 44 may itself become a parent node by subdivision into eight octants, wherein each octant is a further child node 46. In this situation, the octree data structure may be recursive in nature as each node may be subdivided until a set parameter is met. Typically the process of determining the subdivision of octree coordinates is by averaging those of the parent node.

In order to determine what parts of an octree are to be included in a 2D graphic for displaying upon the display screen 26, the individual nodes 42, child nodes 44 and further child nodes 46 are subjected to testing by a testing module. The testing, also known as frustum culling, comprises having a viewing frustum, which defines the portion of the octree to be displayed upon the electronic display screen 26, project upon the octree. The testing module then determines whether the individual node 42 falls within the viewing frustum. If the individual node 42 falls outside of the viewing frustum, the individual node 42 is not displayed upon the electronic display screen 26 and is discarded. If the individual node 42 falls within the viewing frustum, the associated child nodes 44 will undergo the test. This process is recursively repeated until a level is reached where the size of the subsequent children nodes reach a size parameter, such as a size that is too small to effect to the electronic display screen 26, or a size that is at or below a desired resolution.

Figure 4:
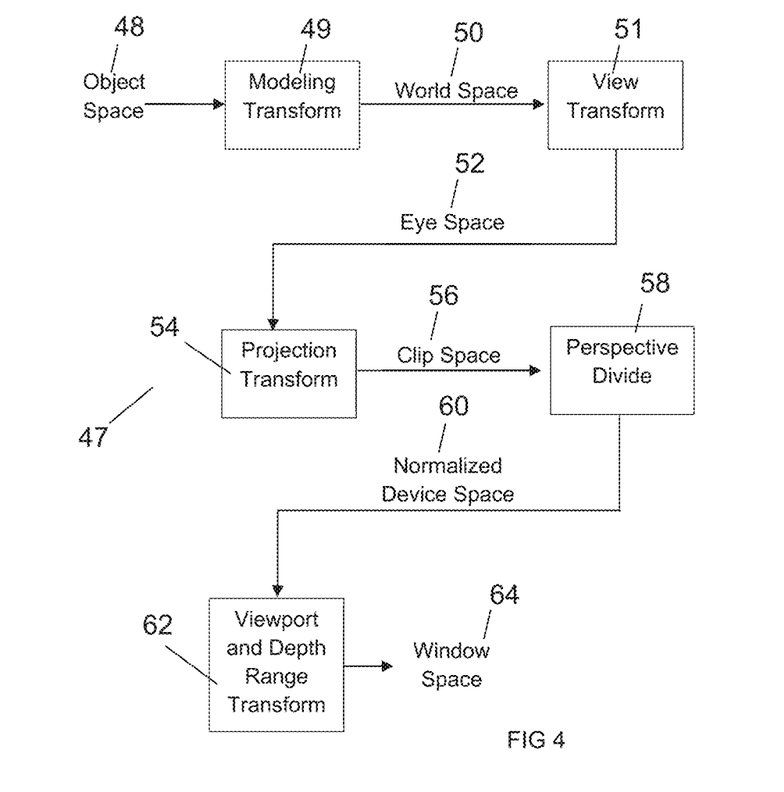
FIG. 4 illustrates a flowchart of a typical rendering pipeline.

FIG. 4 shows a typical rendering pipeline flowchart 47. The rendering pipeline flowchart 47 displays the data coordinates and the transformations required to progress from the original data structure coordinates to a final display coordinate for displaying to the display screen 26. The process involves having a set of coordinates in object space 48 undergoing a modelling transformation 49 to have the coordinates converted into a set of coordinates in world space 50. The model coordinates are represented by 4 dimensional homogeneous coordinates (x, y, z, w) of vertex positions, with w usually being 1 for object coordinates within the model view and projection matrices being linear transformations. The set of coordinates in world space 50 undergo a view transformation 51 to have the coordinates converted into a set of coordinates in eye space 52. The set of coordinates in eye space 52 undergo a projection transformation 54, which may be either perspective or orthogonal, to have the coordinates converted into a set of coordinates in clip space 56. The set of coordinates in clip space 56 undergo a perspective division 58 by its w to have the coordinates converted into a set of coordinates in normalised device space 60. There may be implementation specific variations of the transformation to clip space according to, for example, whether OpenGL or Direct3D is used. The transformation from clip space to normalised device coordinates (NDC) in normalised device space 60 is non-linear. The set of coordinates in normalised device space 60 undergo a viewport and depth range transformation 62 to have the coordinates converted into a set of coordinates in window space 64 which may then be displayed on the display screen 26.

It is generally known that the portion in which data structures, such as the octree mentioned above, are subjected to the testing is when the data structure is found as a set of coordinates in world space 50. After determining which nodes are to be displayed on the electronic display screen 26, the nodes undergo the multitude of transformations until they are transformed into the set of coordinates in window space 64 in order to be displayed on the electronic display screen 26. It is known that the testing is computationally intensive and the whole process is typically shunted to the rendering pipeline located on the graphics processing unit 24. Furthermore, it is possible to have the central processing unit 14 assist the graphics processing unit 24 by running a parallel rendering pipeline.

Figure 5:
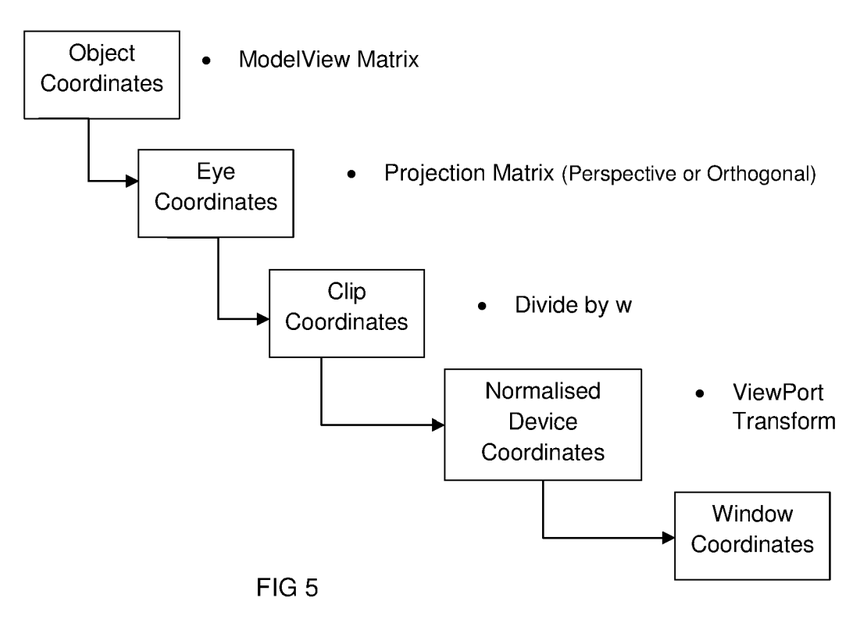
FIG. 5 is an alternative representation of the method of FIG. 4.

In the present invention the method of computer graphics rendering differs from known techniques, in that the testing is conducted when the coordinates in world space 50 have been transformed into coordinates in clip space 56. FIG. 5 shows a flowchart wherein the individual node in world space 42A undergoes a view and projection transformation 66 conducted by a transform module 106 to result with the individual node in clip space 42B. The individual node 42 undergoes a subdivision process 68 of averaging the corners of a plurality of child nodes in clip space 70 by a dividing module 110 prior to being tested by the testing module 116. The testing involves a first step 72 wherein the viewing frustum is projected upon the plurality of child nodes in clip space 70 and child nodes not overlapping with the viewing frustum are discarded, producing a view frustum with remaining child nodes 74. The plurality of child nodes that overlap with the viewing frustum undergo a further subdivision and test 76 to produce a plurality of further child nodes. If the plurality of further child nodes 78 still retains nodes that are outside of (i.e. not fully within) the viewing frustum, these further child nodes undergo further subdivision and processing until there are no longer any overlap of nodes with the viewing frustum, producing a plurality of culled nodes and retained nodes 78. The plurality of retained nodes 78 undergo subsequent transformations in a display module 122 for display on the display screen 26. Because the NDC represents the view frustum as a 3 dimensional cube from (−1, −1, −1) to (1, 1, 1) and is obtained by dividing each clip coordinate by its w it then becomes apparent that frustum culling in clip space is simply done by constraining each coordinate to the range −w to +w.

The plurality of retained nodes 78 may be subjected to a recursive loop 82 of further subdivision and testing, until a required depth or resolution is reached. This produces images more quickly for display on the display screen 26 in comparison to known techniques.

Additionally, the plurality of retained nodes 78 may be displayed on the display screen 26 by bit block transfer.

The combined transformation from object to clip coordinates is linear once the top node of the octree is transformed to clip space. The clip space coordinates of the child nodes of the octree can be obtained using the same averaging procedure used in object space. Now having the octree coordinates in clip space these can be used and the simple comparisons for view frustum culling in clip space can be performed to efficiently traverse the octree and obtain the data required to produce an image to "blit" to the screen. Additionally, clip space in the x and y directions map directly to the horizontal and vertical window axes in a proportional manner. Hence it is possible to map clip space x, y to window space pixels and hence determine when the dimensions of the node are smaller than a pixel and too small to effect the display so as to determine the stop condition of the recursive subdivision of nodes.

The invention advantageously provides a method of computer graphics rendering in which the testing is reduced in complexity so that it is computationally relaxed compared to the typical method. As such, the method of computer graphics rendering allows the central processing unit 14 to conduct the transformation of positional coordinates via the rendering pipeline in a manner that does not require the graphics processing unit 24 to be actively employed. Furthermore, due to improved efficiency the method of computer graphics rendering allows for the octree structures to be displayed on the electronic display screen 26 at real time frame rates.

Modifications may be made to the present invention within the context of that described and shown in the drawings. Such modifications are intended to form part of the invention described in this specification.

The invention claimed is:

1. A method of computer graphics rendering implemented upon a processor, the method comprising:
    loading a data structure representing at least a part of a scene in world space for display into the processor;
    transforming the loaded data structure from world space into clip space;
    recursively:
    subdividing the transformed data structure in clip space so as to form a plurality of child data structures, each child data structure comprising at least one node;
    testing which of the plurality of child data structures in each recursion are within a viewing frustum, so that child data structures outside of the viewing frustum are discarded and a plurality of remaining nodes are retained;
    wherein the plurality of remaining data nodes become parent nodes of the transformed data structure for further subdivision in another recursion until the plurality of remaining data nodes do not overlap with the viewing frustum,
    and
    processing the plurality of remaining data nodes for generation of an image on a display device.

2. A method as claimed in claim 1, wherein the data structure in world space comprises a parent octree.

3. A method as claimed in claim 2, wherein transforming the data structure from world space to clip space comprises transforming the parent octree node from world space to clip space.

4. A method as claimed in claim 2, wherein subdividing the transformed data structure in clip space so as to form child data structures comprises subdividing the parent octree node in clip space so as to form eight child octree nodes.

5. A method as claimed in claim 1, wherein the recursion ends when the size of a plurality of remaining nodes is too small to effectively display on the display screen.

6. A method as claimed in claim 1, wherein the image is generated on the electronic display device by bit block transfer.

7. A method as claimed in claim 1, wherein the loaded data that is transformed includes data structures that reference at least one object that is outside of the viewing frustum.

8. A method as claimed in claim 1, wherein the transforming step is not preceded by a step that culls objects that are outside of the viewing frustum.

9. A system of computer graphics rendering, the system comprising:
    a processing unit in communication with a memory device storing a data, wherein the processing unit is arranged to control a display device, wherein the processing unit is arranged to create or load a data structure representing at least a part of a scene in world space for display;
    a transform module for transforming the data structure from world space to clip space;
    a dividing and testing module for recursively:
    subdividing the transformed data structure in clip space so as to form a plurality of child data structures, each child data structure comprising at least one node;
    testing which of the plurality of child data structures in each recursion are within a viewing frustum, so that child data structures outside of the viewing frustum are discarded and a plurality of remaining nodes are retained;
    wherein the plurality of remaining data nodes become parent nodes of the transformed data structure for further subdivision in another recursion until the plurality of remaining data structures nodes do not overlap with the viewing frustum, whereupon the recursion ends,
    and
    a display module for processing the plurality of remaining data structures for generation of an image on the display device.

10. A system as claimed in claim 9, wherein the processing unit is configured to create or load the data structure in world space so that the data structure comprises a parent octree; the transform module is configured to transform nodes of the parent octree from world space to clip space; and the dividing and testing module is configured to subdivide the transformed nodes of the parent octree in clip space so as to form eight child octree nodes.

11. A system as claimed in claim 9, wherein the dividing and testing module is configured such that the plurality of remaining nodes that do not overlap with the viewing frustum are recursively subjected to the subdivision and testing until the size of a plurality of remaining nodes are too small to effectively display on the electronic display screen.

12. A system as claimed in claim 9, wherein the display module comprises a bit block transfer module for transferring the data structure representing the image to a GPU for generation of the image on the display device.

13. A processor and a non-transitory storage medium storing computer readable instructions, the processor configured to perform the method according to claim 1.

14. A processor and a non-transitory storage medium storing computer readable instructions, the processor configured to perform the method according to claim 2.

15. A processor and a non-transitory storage medium storing computer readable instructions, the processor configured to perform the method according to claim 3.

16. A processor and a non-transitory storage medium storing computer readable instructions, the processor configured to perform the method according to claim 4.

17. A processor and a non-transitory storage medium storing computer readable instructions, the processor configured to perform the method according to claim 5.

18. A processor and a non-transitory storage medium storing computer readable instructions, the processor configured to perform the method according to claim 6.

19. A processor and a non-transitory storage medium storing computer readable instructions, the processor configured to perform the method according to claim 7.

20. A processor and a non-transitory storage medium storing computer readable instructions, the processor configured to perform the method according to claim 8.

* * * * *

UNITED STATES PATENT AND TRADEMARK OFFICE
CERTIFICATE OF CORRECTION

Page 1 of 1

PATENT NO. : 10,650,575 B2
APPLICATION NO. : 15/571262
DATED : May 12, 2020
INVENTOR(S) : Shane Douglas It is certified that error appears in the above-identified patent and that said Letters Patent is hereby corrected as shown below:

On the Title Page

Item (72), Inventor should read:
Shane Douglas  Perth (AU)

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*